United States Patent

Danz et al.

[11] Patent Number: 5,919,244
[45] Date of Patent: Jul. 6, 1999

[54] DESIRED PERFORMANCE INPUT FUZZY LOGIC CONTROL SYSTEM FOR AUTOMATIC TRANSMISSIONS

[75] Inventors: Wolfgang Danz, Friedrichshafen; Udo Gillich, Meckenbeuren; Gerhard Eschrich, Tettnang; Wolfgang Runge, Ravensburg, all of Germany

[73] Assignee: ZF Friedrichshafen AG, Friedrichshafen, Germany

[21] Appl. No.: 08/586,877

[22] PCT Filed: Jul. 25, 1994

[86] PCT No.: PCT/EP94/02448

§ 371 Date: Feb. 28, 1996

§ 102(e) Date: Feb. 28, 1996

[87] PCT Pub. No.: WO95/04234

PCT Pub. Date: Feb. 9, 1995

[30] Foreign Application Priority Data

Jul. 28, 1993 [DE] Germany ............................. 43 25 296

[51] Int. Cl.[6] ...................................................... G06F 3/00
[52] U.S. Cl. .................................. 701/57; 701/65; 477/138
[58] Field of Search ............................... 701/51, 57, 58, 701/61, 65, 66; 477/120, 138, 904; 706/900

[56] References Cited

U.S. PATENT DOCUMENTS

| | | | |
|---|---|---|---|
| 4,841,815 | 6/1989 | Takahashi | 701/57 |
| 5,303,153 | 4/1994 | Sakai et al. | 701/57 |
| 5,319,555 | 6/1994 | Iwaki et al. | 701/57 |
| 5,389,050 | 2/1995 | Sakai et al. | 701/57 |
| 5,390,117 | 2/1995 | Graf et al. | 701/57 |

FOREIGN PATENT DOCUMENTS

| | | |
|---|---|---|
| 0304089 A2 | 2/1989 | European Pat. Off. . |
| 0 347 263 A2 | 12/1989 | European Pat. Off. . |
| 0347261 A2 | 12/1989 | European Pat. Off. . |
| 0 375 155 A1 | 6/1990 | European Pat. Off. . |
| 0 377 953 A2 | 7/1990 | European Pat. Off. . |
| 0454504A3 | 10/1991 | European Pat. Off. . |
| 0532363A2 | 3/1993 | European Pat. Off. . |
| 0532365 A2 | 3/1993 | European Pat. Off. . |
| 0532365A2 | 3/1993 | European Pat. Off. . |
| 0576703 A1 | 1/1994 | European Pat. Off. . |
| 41 07 879 C2 | 3/1994 | Germany . |
| 4334146A1 | 4/1994 | Germany . |
| 4337164A1 | 5/1994 | Germany . |
| 4337957A1 | 5/1994 | Germany . |
| WO 93/23689 | 11/1994 | WIPO . |

Primary Examiner—William A. Cuchlinski, Jr.
Assistant Examiner—Ed Pipala
Attorney, Agent, or Firm—Davis and Bujold

[57] ABSTRACT

The invention concerns a control system for shifting gears in an automatic shift transmission (3) by using fuzzy logic methods. Vehicle parameters form input variables (8) that are continuously detected by appropriate means (9). These input variables are further processed in downstream functional blocks (11, 12, 13, 14, 15, 16 and 17). Gearshifting points that ensure an economical driving are determined in the functional block (11) according to fuzzy logic methods. Besides a set of basic fuzzy logic generating rules, additional rules are used to improve driving. For that purpose, the input quantity "desired performance" is taken into consideration in both sets of rules. The desired performance may be a desired acceleration or a desired deceleration. A closed regulation circuit is formed by converting the fictitious quantity desired performance and the quantity driving manner to a physical quantity.

17 Claims, 6 Drawing Sheets

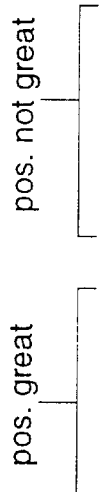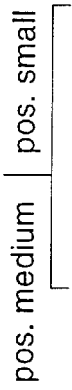
Fig. 2

CHANGE OF ACCELERATOR POSITION

|  | negative | medium | small |  |
|---|---|---|---|---|
|  | NG | NM | NK |  |
| MG | (SK | SK | SK) |  |
| K | K | (SK | SK) |  |
| SK | G | M | K |  |

(vertical axis: ACCELERATOR PEDAL POSITION)

MG: medium great
G : small
SK : very small
NG: negatively great
NM: negatively medium
NK: negatively small

DESIRED ACCELERATION

Fig. 5

DECELERATION

|  |  | G | M | K |
|---|---|---|---|---|
|  | G | SG | SG | G |
| Brake (-time) | M | SG | G | M |
|  | K | G | M | K |
| Brake | A | SG | G | M |

SG: very great
G : great
M : medium
K : small
A : active

DESIRED ACCELERATION

Fig. 6

DRIVER'S DESIRE = DESIRED TORQUE ≥ TRACTION EXCESS

DESIRED PERFORMANCE INPUT FUZZY LOGIC CONTROL SYSTEM FOR AUTOMATIC TRANSMISSIONS

The invention concerns a control system for changing the ratio of an automatic transmission. It specially concerns a control by use of fuzzy logic methods for determining the gearshifting point. Means (sensors, switches, etc.) exist for detecting input variables derived from a driver-vehicle system. Related functions, that is, fuzzy sets, are produced for the input variables; means likewise exist for this. Means such as hydraulically actuatable shift clutches and valves are also provided for changing transmission ratios. The means for detecting the input variables, the means for producing related functions and the means for changing the transmission ratio interact in a certain manner: according to fuzzy generating rules, output variables are found with which a transmission ratio is determined.

Automatic transmissions serve basically for the adaptation of the torque delivered by an input engine of a vehicle to the traction need thereof. Such automatic transmissions have an electronic-hydraulic control. To the electronic control a central significance must be conceded for the whole driving characteristics, since the gearshifting operations are detected and carried out by means of loadspeed characteristic fields.

Whether and which gear to engage depends on the load adjustment, that is, the actual state of the throttle valve and of the output speed of the transmission. The individual speed levels are shifted according to shift characteristic lines which are formed from said two parameters. The shift characteristic lines of an automatic transmission consist of upshift and downshift straight lines for the individual gears which, in a shift diagram, extend in such a manner that a hysteresis generates between the individual gear ranges. Despite said hysteresis, it is precise, invariant decision thresholds which determine whether and what gear to engage. The use of such exact decision thresholds means, on one hand, that only discrete, invariant states can lead to the start of a shifting operation and on the other that here systematically exists an adulteration of the logical information content of the decision. The shift characteristics of an automatic transmission can be changed by activating adaptive shift characteristic lines, that is, shift characteristic lines which according to the driving performance are oriented to the consumption or special driving modes.

Despite a multiplicity of possibilities already used for automated determination of the shifting point, the objective of approximating the automatic gear selection to the behavior of a human driver, specially of a certain type of driver, has been only imperfectly achieved.

A possibility of better representing human decision finding than is possible by threshold values or characteristic fields, is the use of fuzzy logic methods. A fuzzy inference system makes possible a decision in which a multiplicity of parameters are taken into consideration and includes features of human decision finding. A great advantage of this method consists in that it allows a direct processing of verbally formulated problem descriptions. Contrary to the conventional control strategies, judgment criteria which cannot be comprised in mathematical description forms but play an essential part in the finding of a decision can be used.

An example of a control system for shifting an automatic transmission using fuzzy logic methods is to be understood from U.S. Pat. No. 4,841,815. The vehicle speed or change thereof, the engine load or change thereof and the driving resistance are processed as input variables in such a manner that fuzzy references are assembled for each gear to be shifted. This control system is based on a complex matrix consisting of parallel fuzzy references interlinked in series. Compared to a transmission control where the speed level is determined only by the vehicle speed and the opening of the throttle valve, the fuzzy control thus disclosed represents an improvement, since the aforementioned exact decision thresholds do not exist.

However, the known control has disadvantages in two respects. The whole shifting decision is based only on three rules the premium members of which are linked by a logic OR (upshifting, downshifting and maintaining the speed). The feature characterizing the fuzzy logic methods of interlinking positive and negative regulation decisions for the total information plays only a subordinate part in this solution. Besides, no fuzzy rules of the type "when. . . , then. . . " are used to represent the expertise of a human driver. Finally, functionally complicated fuzzy sets are used. The sets are not formed by straight lines but by functions deviating from straight lines which are mathematically costly to describe and analytically costly to process. For the instant case of a relatively small number of input variables, it is possible to start from acceptable computer times. The proposed representation of the fuzzy set and the processing thereof is not adequate for complex systems.

A control system for shifting gears of an automatic transmission by the fuzzy logic method and making use of fuzzy generating rules is to be understood from EP-A-0 347 261 and EP-A-0 347 264. The solutions proposed concern the treatment of special driving situations in order to optimize the driving characteristics. What is specially involved is to prevent undesirable oscillating gearshifts.

These known solutions use a very large number of fuzzy generating rules. This leads in part to very similar information contents and limitations to exact threshold decisions. Another consequence of the very large number of fuzzy generating rules is an unoptimated control installation that is only relatively expensive to implement and leads to comparably long computation times.

EP-A-0 375 155 refers to the gearshifting of an automatic transmission using fuzzy logic methods in which the gearshifting is effected taking into consideration an excess of traction force. EP-A-0 377 953 likewise refers to proposals for gearshifting taking into consideration excess of traction force; undesired oscillating shifts in mountain driving and/or added trailing loads are to be particularly taken into consideration.

DE-A-41 07 870 is also counted among the solutions which take into consideration special driving situations using fuzzy logic.

A control system for gearshifting automatic transmissions taking into consideration the normal operation and also special driving situations making use of fuzzy logic is further to be understood from EP-C-0 454 504. This system also is based on a similar large number of fuzzy rules which are equalized with each other. An exception to this is constituted by priority rules (metarules) which prevent overdriving of the engine. An unoptimated control system with a large number of rules is also involved in this solution.

This invention is based on the problem of providing a control system for gearshifting automatic transmissions making use of fuzzy logic methods which is capable of reacting to a certain desired performance of the driver. By the designation "desired performance" is not to be understood here any physical quantity, but the capacity of the control system to detect desired deceleration or desired acceleration of the driver taking into consideration an actual driving mode or an actual driving situation.

The problem on which the invention is based is solved by the fact that at least the input variables of the throttle valve position or accelerator pedal position and the adjustment dynamic thereof are interlinked by fuzzy generating rules according to magnitude and direction as a function of time. The quantity resulting from said linkage represents a desired performance of the driver. It forms an input variable for a set of basic and additional rules of fuzzy generating rules. By the designation desired performance is to be understood here a functionally composed quantity which gives information as to the extent to which the driver is satisfied with an actual driving mode. In a simpler embodiment it suffices in the first place to process the desired performance in combination with the parameters engine speed, throttle valve position, gradient and the actual speed level in fuzzy generating rules. These represent the expertise of a driver of a vehicle equipped with a transmission to be manually shifted. The disadvantages of the prior art in automatic transmissions are prevented by using fuzzy logic methods. Said disadvantages are to be attributed in the first place to the fact that the shift diagrams contain exact decisions thresholds and are conditioned only on the basis of throttle valve opening and vehicle speed.

It is convenient if the fuzzy (basic) generating rules are supplemented by an additional set of rules. Said additional set of rules takes into consideration situation-conditioned driving modes in which the driver's desired performance has been taken into account. The desired performance is here a functionally composed quantity, therefore, no measurable physical quantity.

The quantity of the desired performance used in the set of basic and additional rules is preferably generated as an output variable in an independent fuzzy module. It has proved very convenient here if the connection between accelerator pedal position (throttle valve position) and the gradients thereof is found from the survey of a representative cross section of drivers. The connection between said quantities and the desired performance derived therefrom is naturally liable to a subjective variation. The survey of a representative cross section of drivers creates a neutral base for judgment independent of whether a particular driver drives sportingly or economically.

In an enlarged extension of the solution according to the invention, there are taken into consideration, together with the desired performance which corresponds to a desired acceleration, the desired performance which corresponds to a desired deceleration. It is convenient to detect said desired deceleration via the accelerator pedal (throttle valve) and/or the brake. It has proved useful here to differently quantitatively weight the desired deceleration shown via the accelerator pedal or via the brake.

In order to positively control the driveability, it is also very advantageous to differently evaluate the direction of change of the desired performance. In case of positive changes (open throttle) the driver expects an immediate reaction of the vehicle. Therefore, an undelayed transmission to the further processing control system is advantageous. On the other hand, in case of negative changes of desired performance (close throttle) a delayed transmission is to be felt as pleasant. The delay in addition dampens an instability fed by the driver via the accelerator pedal.

It is advantageous to implement the delay discussed by a functional filter structure. In this connection, it has proved very advantageous if the deceleration time constant is variable. In case of variable time constants in the lower load range, the driver can act more sensibly upon the vehicle than is desired in the upper load range.

To arrive from one control to a closed driving circuit, it is proposed in another solution of the problem posed according to the invention to generate a physical quantity according to fuzzy generating rules, by the functional blocks for detection of a desired acceleration or deceleration (desired performance) and for identification of the driver. Said physical quantity is the excess of traction which has been fed into the regulation circuit as a nominal value. The actually existing excess traction calculated from F=m×a is compared with the nominal value as a feedback value.

In this closed regulation circuit, a control unit is preferably used which works according to fuzzy generating rules. It delivers, depending on the actual driving situation, a gear or a ratio step to be adjusted as a regulated quantity for the automatic transmission.

The above explained solutions according to the invention are applicable not only to automatic multi-step transmissions. The invention is rather to be implemented also in automatically infinitely variable transmissions (CVT). It is also possible to use the proposed solutions in combination with a propulsive regulation (ASR) or an ABS.

Other features essential to the invention and the advantages resulting therefrom are to be understood from the description that follows with reference to the drawings. In the drawings:

FIG. 2 is a matrix representation of the control system for detecting the desired performance;

FIG. 5 is a matrix representation of the control equipment for detecting the desired deceleration according to the position or change of position of an accelerator pedal;

FIG. 6 is another matrix of control equipment which includes the braking activities for representing a desired deceleration;

Figure 1:
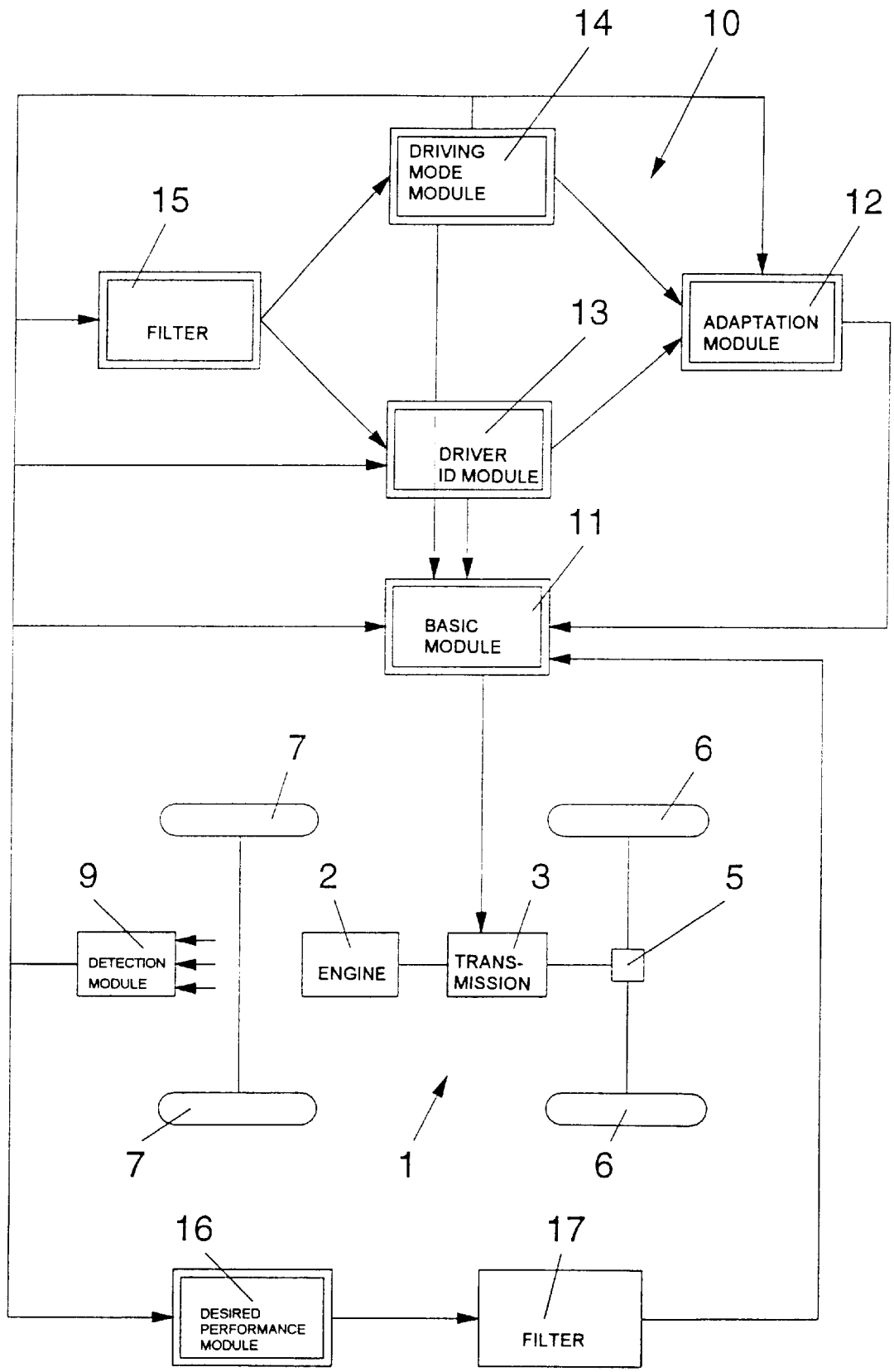
FIG. 1 is a diagrammatic summary of the control system.

In FIG. 1 is diagrammatically drawn a vehicle 1 with the main components thereof: engine 2 and automatic transmission 3, a drive shaft 4, a differential transmission 5, the driven wheels 6 (front and/or tail driven) and the steerable wheels 7.

A series of vehicle parameters form input variables 8 which are continuously detected by appropriate means 9 (mechanical or electric switches, sensors of any desired construction). Said input variables can be, for example, the following vehicle parameters: throttle valve position, gradient of a change in the throttle valve position, actual speed (wheel speeds), longitudinal acceleration, deceleration, position of a transmission selector lever, calculated excess traction after a possible upshift, magnitude of the transverse acceleration, magnitude of the steering angle, steering angle speed, brake switch on/off.

A control system 10 for gearshifting the automatic transmission 3 is composed of several functional blocks:

one functional block 11 as basic module, one functional block 12 as adaptation module, one functional block 13 as module for driver identification, one functional block 14 as module for detecting the driving mode, one functional block 15 which fulfills different filtering tasks, one functional block 16 as module for detecting a desired acceleration or deceleration (defined here as desired performance) and one functional block 17 which also fulfills filtering tasks.

Between the functional blocks 11 to 17 of the control system 10 exists a linkage marked by directional arrows.

Functional block 11:

In the functional block 11, shifting points that reproduce a specific, preferably economic, driving manner are determined as basic module by fuzzy logic methods. Rules 1 to 6 set forth below form a set of basic rules of fuzzy generating rules for determining the shifting point which defines a consumption-oriented driving manner. The rules are preferably subdivided into priority classes whereby account is taken of special requirements (for example, priority rules for reasons of safety).

Rule 1:

Parameters used . . . engine speed (rpm), actual speed level

Rule conclusion: ". . . upshift one gear."

Rule statement: "when engine speed is high and speed level low, upshift one gear."

Rule 2:

Parameters used . . . engine speed, actual speed level

Rule conclusion: ". . . downshift one gear."

Rule statement: "when engine speed is low and speed level high, downshift one gear."

Rule 3:

Parameters used . . . engine speed, speed level

Rule conclusion: ". . . maintain gear."

Rule statement: "when engine speed is medium, maintain gear."

Rule 4:

Parameters used . . . engine speed, throttle valve position (theta), gradient of throttle valve position (delta-theta)

Rule conclusion: ". . . downshift one gear."

Rule statement: "when desired performance is great, gear is high, engine speed not extremely high and gradient of throttle valve not negative, downshift one gear."

Rule 5:

Parameters used . . . throttle valve position, throttle valve gradient, engine speed Rule conclusion: ". . . upshift one gear."

Rule statement: "when desired performance is small and engine speed not low, upshift one gear."

Rule 6:

Parameters used . . . throttle valve position, throttle valve gradient, engine speed, actual speed level Rule conclusion: "downshift one gear."

Rule statement: "when desired performance is very great, engine speed not too high, gear high and throttle valve gradient not negative, downshift one gear."

The above formulated rules 1 to 6 form the basic set of rules of fuzzy generating rules for determining the shifting point. Instead of the parameters throttle valve position and gradient of the throttle valve position, equivalent parameters appear depending on the nature of the performance regulating mechanism of the engine. Insofar as the parameter engine speed is used in the basic set of rules, other parameters from the turbine speed (transmission with converter), from the transmission input speed or from an equivalent parameter can be used as substitutes. These are, for example, the position of the accelerator pedal and the change of position of the accelerator pedal (E-gas or the like). In this set of basic rules the driver's desired performance is taken into account.

By the designation "desired performance" is to be understood here a functionally composed quantity which gives information about the extent to which the driver is satisfied with an actual driving mode. The desired performance combined with the parameters engine speed, throttle valve position, gradient (periodic change) of the throttle valve position and the actual speed level lead to rules which constitute the expertise of a driver of a vehicle equipped with a transmission to be manually shifted. The fuzzy logic method makes possible a verbal description of the problem and therewith the optimation of the output values on the basis of easily understandable relations. The consequence of this is that possible operating conditions of the vehicle are expressed in a multiplicity of variables which are constantly examined and updated taking into consideration external conditions (detection of the driving mode) and the driver (driver identification). By the permanent processing of the input variables it is possible to gearshift the automatic transmission so as to coincide with the decisions of an expert. By the use of fuzzy logic methods there is obtained a control in the same manner as an expert actuates a manual gearshift transmission, there being avoided the disadvantages of the prior art in automatic transmissions. Said disadvantages are to be attributed to the fact that the gearshift diagrams contain exact, invariant decision thresholds and are based only on the opening of the throttle valve and the speed of the vehicle (output speeds).

The objective of rules 1 to 3 of the set of basic rules is to retain the engine speeds on a medium level (objective: consumption optimization). The purpose of rule 4 is to move the shifting points to higher speeds. Compared to the rule statement "maintain" this rule is more precisely worded. In case of great desired performance the gear must be lower than it results from rules 1 to 3.

Rule 5 complements rule 4. Its purpose is to cut through to higher gears as soon as possible in case of a small desired performance. Rule 6 reinforces a tendency to decide in the direction of downshifting when a very great performance is indicated (effect of a kick-down rule). Combined with the additional rules (see further below, for example, additional rule 3), downshifts over several gears (double to triple downshifts) are possible in this manner.

The set of basic rules can now be extended in order to still further improve the driveability. This concretely means to still more strongly take into consideration the driver's desired performance. The use of the following additional rules has proved very advantageous here:

Additional rule 1:

Parameters used . . . desired performance (throttle valve position, throttle valve gradient), engine speed, actual speed level Rule conclusion: ". . . maintain gear."

Rule statement: "when desired performance is very great and engine speed from medium to high, maintain gear."

Additional rule 2:

Parameters used . . . throttle valve position, throttle valve gradient, actual speed level Rule conclusion: ". . . maintain gear."

Rule statement: "when throttle valve position is high and throttle valve gradient low, maintain gear."

Additional rule 3:

Parameters used . . . throttle valve position, engine speed, actual speed level

Rule conclusion: ". . . downshift one gear."

Rule statement: "when the kick down is actuated and the engine speed uncritical, downshift one gear."

Additional rule 4:

Parameters used . . . throttle valve gradient, acceleration (m/sec$^2$), actual speed level Rule conclusion: ". . . maintain gear."

Rule statement: "when throttle valve gradient is positive-medium and acceleration sufficient and actual speed level low, maintain gear."

Additional rule 5:

Parameters used . . . brake time, deceleration, engine speed, actual speed level and vehicle speed Rule conclusion: ". . . downshift one gear"

Rule statement: "when desired deceleration is very great (desired performance negatively very great), engine speed from medium to low and vehicle speed not high and actual speed level >2, downshift one gear."

The limitation of this additional rule to speed level >2 results in that, for example, when running into curves the downshift is to the second gear and too strong a deceleration is prevented.

Additional rule 6:

Parameter used . . . engine speed (the parameter engine speed is here compulsorily prescribed and cannot be replaced, for example, by the transmission input speed or a turbine speed).

Rule conclusion: ". . . upshift one gear."

Rule statement: "when engine speed is extremely high, upshift one gear."

The last additional rule serves to protect the engine against overspeeds. Accordingly, this rule has the top priority (priority: 5.0). Additional rules 1 to 3 have the priorities 2.5, 3.0, 2.5 and 2.0).

The basic rules describe by definition specific basic modes. Additional rules 1, 2 and 4 were introduced in order to ensure a harmonic transition behavior between said basic modes. Additional rule 3 makes possible downshifts in an extremely great desired performance. In special situations, additional rule 5 assists an accelerated downshift so that a sufficient traction reserve remains in all driving modes. From the formulation of the additional rules it can be understood that driving modes conditioned by situations are included. Insofar as the engine speed enters as a parameter in the additional rules it can be replaced by a transmission input speed (turbine speed) or an equivalent quantity (additional rule 6 is excepted).

Functional block 12:

The related criteria for economical and performance-oriented gearshifting characteristics on which the known gearshifting strategies are based are the point of departure in the considerations of a shifting point adaptation. A comparison of said standard characteristic lines leads to two generally valid statements:

1. The more performance-oriented (sporting) the driving manner, the higher the speed level and stricter the performance requirements (throttle valve position) in a medium load range, the later the upshift and the earlier the downshift;
2. In the kick-down range the shifting point is independent of the driving manner.

The displacement of the shifting points to be carried out according to said guidelines can basically occur in two ways:

1. Corresponding fuzzy sets of the set of basic rules (functional block 11, basic module) are changed so as to obtain the desired characteristic or
2. Instead of a relatively costly displacement of individual fuzzy sets, the same effect can be obtained by adequate modulation of the relevant control parameters.

Functional block 12 contains fuzzy generating rules which work according to the above guidelines and adapt the behavior resulting from the functional block 11 to inherently changing conditions.

Functional block 13:

From the adaptation rules it follows that the shifting point adaptation depends on a driver's driving manner. In order to induce the functional block 12 to an offset (or other variation of the set of basic rules), to it must be communicated an identification result (input variable of the functional block 12) that the driver according to his driving manner has directly classified from "economical" to "sporting/performance oriented." The functional block 13 delivers said identification result. Said functional block 13 works as driver-identification module.

As features for the driving manner the following parameters (input variable, vehicle parameters) can be used (this preferably takes place here after passing a filter):

Throttle valve position, gradient of a change in the throttle valve position, vehicle speed (output speed), acceleration, deceleration, position of the position switch, excess traction after a possible upshift, transverse acceleration, steering angle according to magnitude and speed, brake switch on/off.

Functional block 13 processes identification rules for identifying a driver according to his driving manner which ranges from a consumption-oriented to a performance-oriented driving manner.

Functional block 14:

Besides taking into consideration a driver's driving manner, it is convenient to include in the assessment a specific driving mode (city, expressway, mountain ascending and descending). Functional block 14 takes care of a corresponding adaptation of the shifting characteristic. Such an extension of the adaptive control system according to the invention appears specially convenient because: in city traffic the driver expects a definitely greater shifting activity than, for example, on the expressway, in mountain driving, specially when driving over serpentines, it is disturbing to the driver when oscillations appear (here must be maintained the gear which offers a sufficient traction reserve); when descending corresponding downshifts are applied so that the braking action of the engine is used.

When the above formulated detections are converted in a fuzzy control system, this leads to a complementary set of adaptation rules of fuzzy generating rules. With said complementary set of adaptation rules of fuzzy generating rules (functional block 11) can be modified by the functional block 12 according to an actual driving mode.

First of all, it is of course necessary to detect the different driving modes. This is done in the functional block 14 in a manner similar to the detection of a specific driving manner (functional block 13).

The input variables of functional block 14 are the output variables of functional block 15 which constitute features filtered, that is, detected, over a long period of time. They also are here in particular the vehicle speed, throttle valve position and gradient of the adjustment of the throttle valve, acceleration, brake switch on/off, engine torque, steering angle, significant vehicle parameters (input variable of functional block 15).

Typical value ranges are coordinated with said quantities. The coordination is carried out depending on a specific driving mode. Therefore, said typical value ranges can be used as features for detecting a specific driving mode.

Functional block 15:

The task of the functional block 15 is to filter the input variables used for identification of the driver. The input variables are reduced to output variables in the form of averaged features. These reduced features allow a detection of the driving manner of a certain driver.

In a preferred extension of the control system according to the invention, the functional block 15 assumes another function as a filter: input variables for detection of the driving mode are reduced to output variables in the form of averaged features which allow a detection of the driving mode. Said function will be discussed in further detail below.

Two possibilities exist for filtering, that is, reducing the input variables used to identify a driver's driving manner to an average behavior:

a) conventional filtering and
b) filtering by fuzzy logic methods.

A filtering by fuzzy generating rules based on two evaluation criteria is preferred: specific features must quickly lead to a classification of the driver. Less specific features must classify the driver cautiously, that is, accordingly more slowly. Expressed in other words this means that a performance-oriented driver is quickly detected as such while, a speedier driver only reaches said evaluation when he maintains his tendency to a performance-oriented driving manner over a long period of time.

Functional block 15 generates (first) on its output an evaluation number by three generally valid rules:

1. when the feature is strongly defined, the evaluation increment is positively high;
2. when the feature is weakly defined, the evaluation increment is negatively high and
3. when the feature is moderately defined, the evaluation increment is zero.

These rules first generate a weighted increment and thus indicate a tendency. Only by subsequently adding said increments does a definitive evaluation number result.

It has proved advantageous to vary the learning times of the feature filter according to the driving mode. In city operation the driving characteristics must be more quickly adapted than in country operation. In the simplest case the adaptation occurs via the vehicle speed. The higher the vehicle speed, the greater the weighting of the evaluation increments (guideline). A finer adaptation to the driving mode can result by linkage with the driving mode module in which the modes "city", "expressway", etc. are directly included in a corresponding control equipment for adaptation of the learning time.

Functional block 16:

The input quantity "desired performance" used in the sets of basic and additional rules is generated in a fuzzy module (functional block 16) according to fuzzy generating rules. The desired performance can correspond here to a desired acceleration or deceleration. In order to represent the desired performance communicated by the driver via the accelerator pedal, said fuzzy module produces an output variable that contains both the absolute accelerator pedal position (throttle valve position) and the adjustment dynamic thereof. Accordingly, the desired performance is not interpreted as a quantity proportional to the absolute accelerator pedal position (throttle valve position). Rather, the dynamic indicated by the driver via the accelerator pedal (throttle valve position) is also taken into consideration.

The invention proposes a possibility of linking the absolute accelerator pedal position (throttle valve position) with the adjustment activity (dynamic), specifically by there being integrated within said fuzzy module 16 the absolute accelerator pedal positions and the gradients thereof. As output variable, said fuzzy module makes available an essentially more appropriate representation of the quantity "desired performance." In said output variables, the fact that the exclusive evaluation of the change in accelerator pedal position shows a non-linear dependence on the momentary range of the accelerator pedal position at a specific evaluation moment is taken into consideration.

Since the interrelation between the accelerator pedal position (throttle valve position) and gradients thereof (adjustment of the throttle valve position as a function of time), and the desired performance derived therefrom is naturally liable to a subjective personally conditioned variation, the control equipment belonging to the fuzzy module "desired performance" was determined in the form of a matrix from the survey of a representative cross section of drivers. Said survey yielded a neutral base of judgment independent of whether a precisely acting driver drive sportingly or economically. The interrelations are reproduced in FIG. 2.

In the lines of said matrix are plotted the possible accelerator pedal positions (throttle valve positions) of SG (very large), G (large), M (medium) and K (small) to SK (very small). The columns contain the amounts of change of accelerator pedal position (change of throttle valve position) extending likewise from SG (very large) to SK (very small).

From the matrix can be understood that the number of rules required for the fuzzy module "desired performance" make at first a theoretical number of 25. By condensing fuzzy sets (highlighted by frames), the theoretically required number of rules is minimized to a number of 9. Account is taken here of one objective of this invention. According to said objective, the number of fuzzy generating rules is to be kept as low as possible in order to obtain a clearly structured control.

Figure 3:
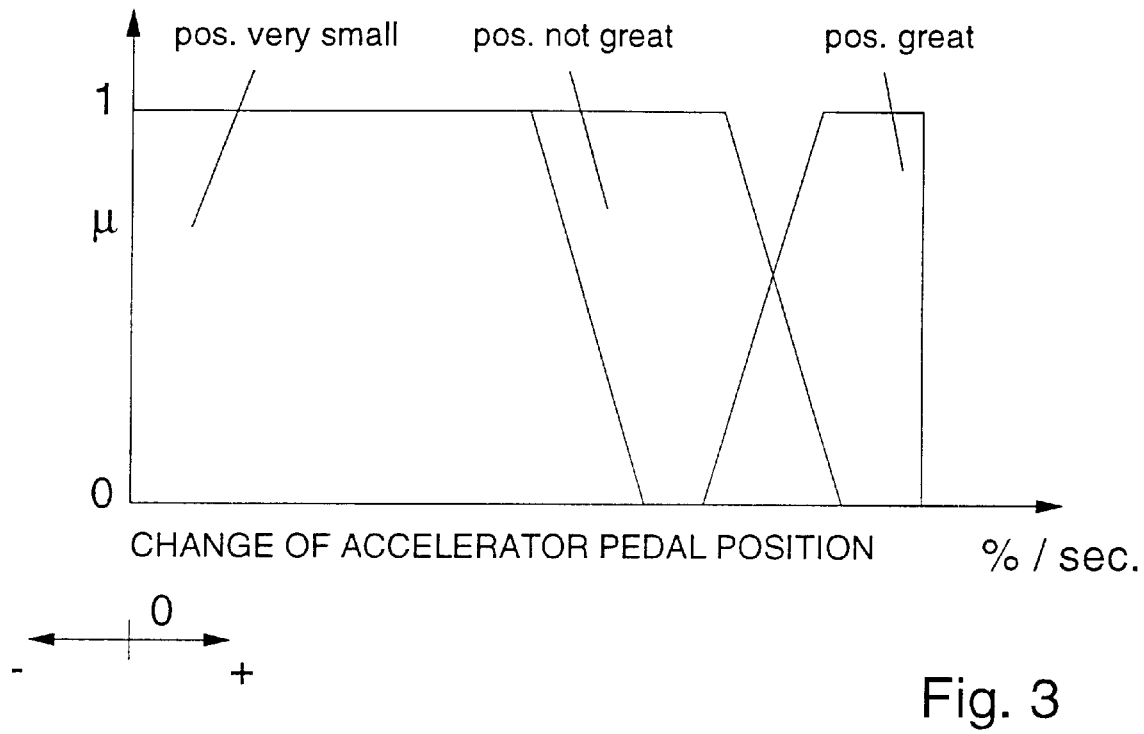
FIGS. 3 and 4 are individual fuzzy (sub) sets belonging to the control system of the desired performance.
Figure 4:
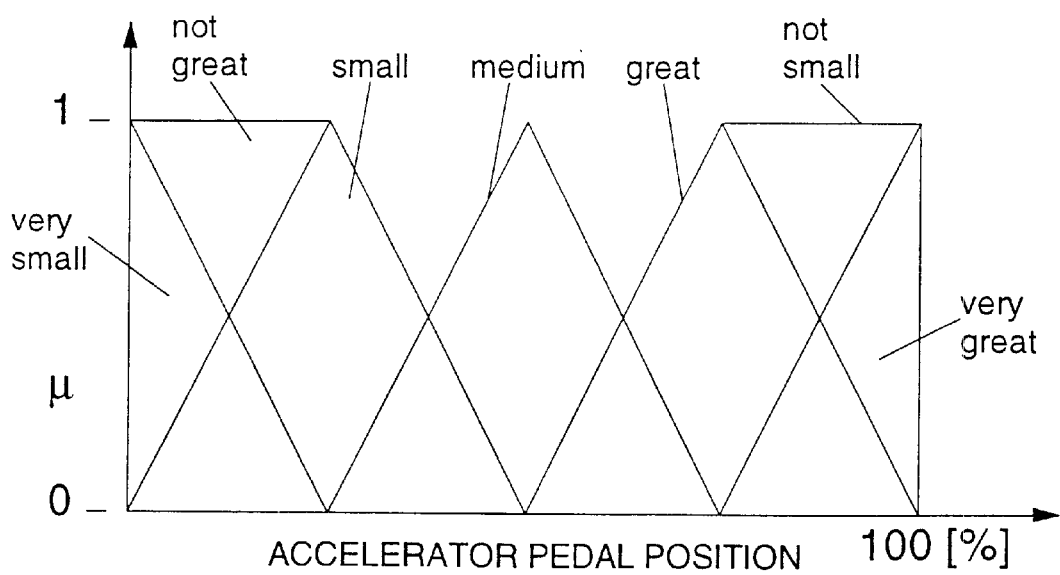

In FIG. 3 and FIG. 4 is shown part of the fuzzy (sub) sets resulting from the reduction of the theoretical number of rules. In the upper diagram (FIG. 3) the sets are reproduced in the example of the change in accelerator pedal position. On the abscissa are plotted the levels of change in accelerator pedal position (percent/second). On the ordinate are plotted related values my from 0 to a maximum of 1. The flat amount of change in accelerator pedal position "positively very small" is plotted by the trapezoidal fuzzy set drawn on the left. The flat amount of change in accelerator pedal position "positively great" is defined by the likewise trapezoidal fuzzy set to the right. Between the flat amounts "positively very small" and "positively great" is the flat amount of change in accelerator pedal position "positively great".

Similarly to this, the diagram in FIG. 4 shows individual fuzzy (sub) sets in the example of the levels of the accelerator pedal position. The flat amounts (in percent) accelerator pedal position "very small", "not great", "small", "medium", "great", "not small" and "very great" are defined by triangular fuzzy sets.

The rules that control the output variable "desired performance are preferably provided with a gamma operator with the compensation degree of 0.3. Said step acts in medium and great values of the change in accelerator pedal position in the sense of an OR operation. The output variable is controlled by a great throttle valve position or great throttle valve gradients. In the conclusion part, the related functions of the output variables are described by simple delta functions with the value of 1 (one).

For the subjective driveability it is advantageous to differently weight the direction of change of the desired performance. In positive changes (quick or slow open throttle), the driver as a rule expects the vehicle to react spontaneously and proportionally to said change in desired performance. The quantity "desired performance" thus must be communicated without delay to the further processing control system.

In negative changes of the desired performance (quick or slow close throttle), it conversely applies that the change is passed on only with delay to the control system.

The delay, on one hand, dampens an instability eventually fed by the driver via the accelerator pedal and on the other it acts as memory mode for the basic module (function block 11). Without said memory mode, system conditions (changes of the throttle valve gradients) which occur briefly could not be further processed in the required manner.

The effect of said conscious delay can be explained in the example of an overhaul operation: an adjustment in a direction toward a higher ratio initiated by great, positive throttle valve gradients was again canceled directly after dampening of the gradient standard. Without delay this change in mode would occur so quickly that the driver's desired performance (great vehicle acceleration) could not be accomplished. A delayed passing on of the negative change (dampening of the gradient standard) makes it possible to quickly terminate the overhaul operation.

Function block 17:

The deceleration discussed is realized by a functional filter structure (functional block 17). The deceleration time constant can be adapted according to the situation. This adaptation takes place preferably in a manner such that in case of high filter input signal values, small time constants (slow reaction) are added up while low filter input signal values produce high time constants (quick reaction). Account is thus taken of the circumstances that in the lower load range (small desired performance) the driver would like to act more responsively upon the vehicle than in the upper load range.

In addition to said constant adaptation, a basic characteristic (quick, slow) can be impressed by an adequate parameter of the filter structure.

Figure 10:
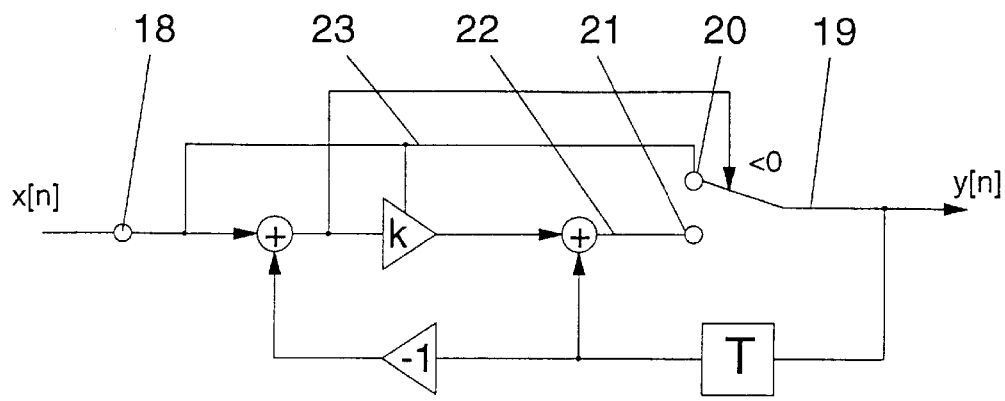
FIG. 10 is a diagrammatic representation of a filter which generates one output variable corresponding to a desired performance.

In FIG. 10 is diagrammatically reproduced a possible development of a functional filter structure. Functional block 16 produces an output variable representing the desired performance in which are contained both the absolute accelerator pedal position (throttle valve position) and the adjustment dynamic thereof. Said output variable abuts as an input variable on the input 18 of the function block 17. The produced output variable y of the filter structure depends on the magnitude of the input variables x. The output variable "desired performance" is passed on to the basic module (functional block 11). The output 19 can be connected by two shifting positions (positions 20 and 21) with a signaling line 22 appearing below in the drawing or a signaling line 23 appearing above. In the connection drawn the input variable x is passed undelayed as output variable y via the line 23 to the output 19. The following filter equations apply:

$$y(n)=x(n) \text{ for } x(n) \geq y(n-1) \text{ and} \qquad \text{I.}$$

$$y(n)=y(n-1)+k(x(n)-y(n-1)) \text{ for } x(n)<y(n-1) \qquad \text{II.}$$

with $k=k(x(n))=X_{max}^{-1}(\text{threshold}^{-1}-b)*x(n)+b$, wherein:
k=a filter time constant by which is weighted the change x(n)−y(n−1). The filter time constant k is a function of x (desired performance) over the time. In small x values the filter time constant k is high and decreases linearly in direction to high x values.

The value $X_{max}$ set forth in filter equation II corresponds to a maximum value of x. Said value is program dependent and therefore can change, depending on situations. The threshold value is an offset with which it is prevented that the filter time constant k becomes zero. By said threshold is also established the initial behavior of the transition function in a jump-like change of the desired performance;

b=with this value is established the behavior during creeping change from x(n). If b is great a very direct consequence occurs toward a change x(n).

If the filter constant k is high, a change from x(n) very quickly becomes effective on the output. If the filter constant k is on the contrary low, a change of x(n) becomes noticeable on the output only with delay. This tendency means the use of lower filter constants and therewith a small weighting of the change in great changes, while small and defined changes, on the other hand, are taken into consideration with high filter time constants, that is, with a quick penetration factor. A small, defined change can mean, for example, the slow (defined) taking back of the accelerator pedal.

In a preferred development of a control system, the function block 16, with which is generated the input quantity "desired performance", used in sets of basic and additional rules can be further improved to shift an automatic transmission. In this preferred development, together with the desired performance corresponding to a desired acceleration, the desired performance corresponding to a "desired deceleration" can be additionally taken into consideration.

This "desired deceleration" is likewise a subjective quantity which expresses the driver's desire for a certain deceleration of the vehicle. A difference is made here between a desired deceleration shown via the accelerator pedal (throttle valve) and a desired deceleration shown via the brake. Both kinds of desired deceleration differ fundamentally by being included with different weight in the total information. When the brake switch is actuated and thus a brake signal is present, the information: "driver would like to decelerate" is relatively certain. Accordingly, a deceleratingly acting step can adequately be decided. It is to be more cautiously proceeded when the driver only takes back the accelerator pedal without effectively braking.

To include the intensity of the actuation of the brake, the brake signal appearing first in digital form is converted to a continuous quantity "braking time". For this purpose, a time step is started during the signal change from zero to one (step on pedal). This remains active until the driver again releases the braking pedal. Thus, an additional information is at the disposal of the processing control equipment. Said information contains the braking time as a decisive basis for identifying the driver's deceleration intention.

The fuzzy generating rules plotted in matrix representations in FIG. 5 and 6, the same as in FIG. 2, produce output variables which constitute both the positive and the negative desired performance. Said output variables are further processed in downstream modules such as function block 17. All fuzzy generating rules are implemented in the function block 16.

Figure 7:
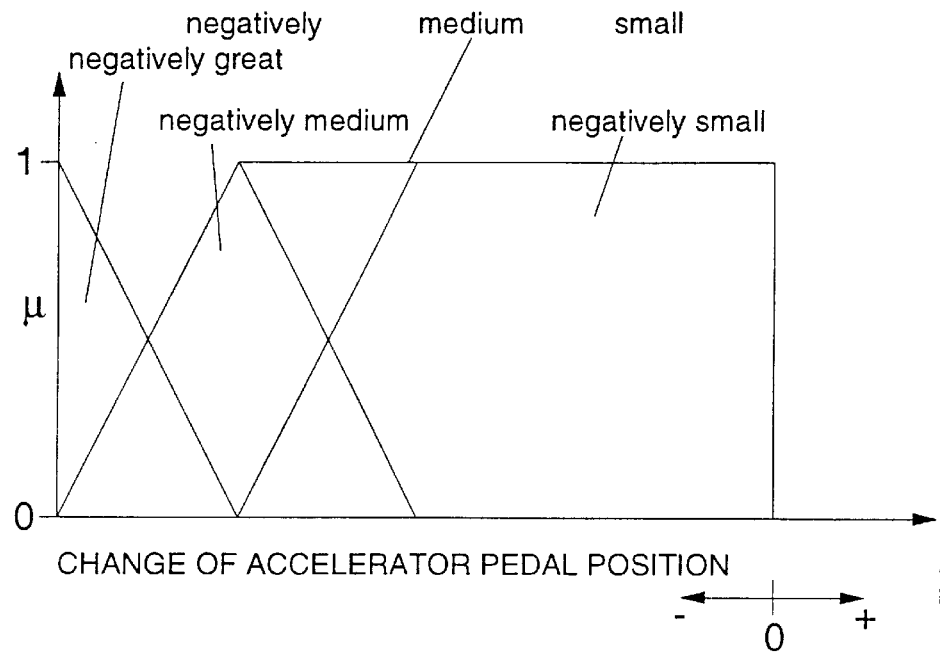
FIGS. 7–9 are individual fuzzy (sub) sets for showing a desired performance in case of deceleration.
Figure 8:
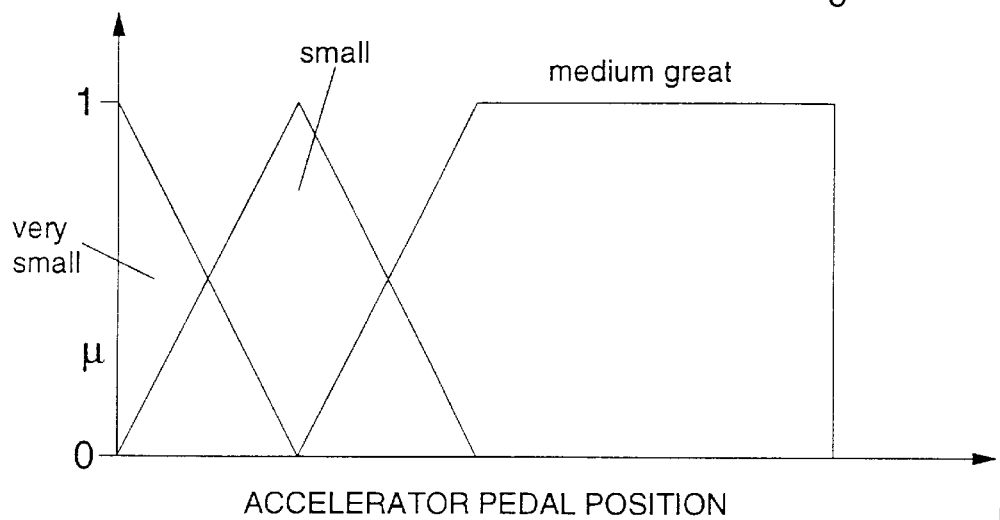
Figure 9:
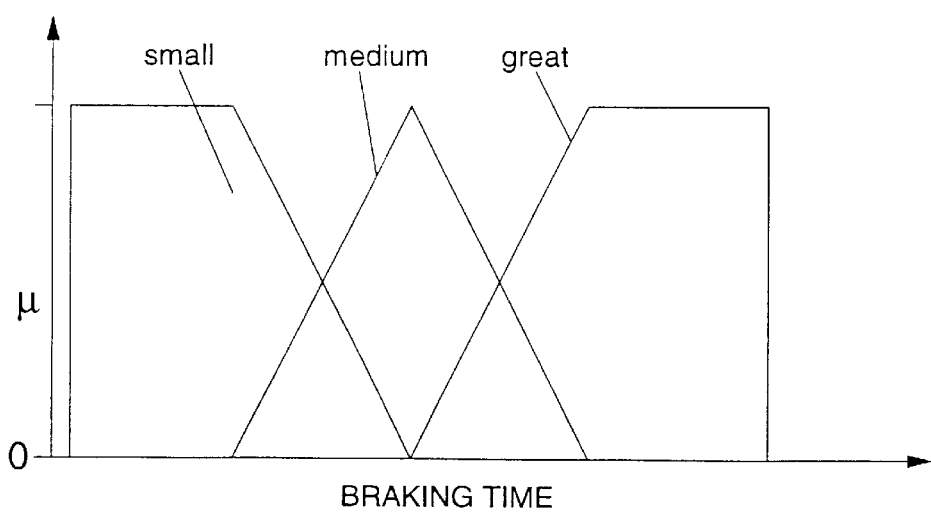

FIG. 7 to 9 show one part of the fuzzy (sub) sets in the example of the change of accelerator pedal position (FIG. 7), of the accelerator pedal position (FIG. 8) and of the braking time (FIG. 9). The levels: negatively great, negatively medium, negatively medium small and negatively small serve to describe the change of accelerator pedal position. The flat quantities very small, small and medium large define the accelerator pedal position. The levels: small, medium and large apply to the braking time.

The quantity "desired deceleration" can be advantageously used in certain driving modes. They are:

1. Utilization of the engine braking action in mountain driving;
2. Prevention of shiftings during quick throttle closing (taking back the accelerator pedal); and
3. Downshifting when actuating the brake.

In mountain driving (case 1), the engine braking action must be utilized. When the accelerator pedal position=zero (that is, desired performance=zero), the actual speed level is first retained. If the driver actuates the brake away from said mode, a downshifting by one or more gears is initiated depending on intensity of the desired performance. Said downshifting is carried out depending on the actual engine speed (turbine speed). An excessive braking of the vehicle is prevented (additional rule 5).

When the accelerator pedal is quickly taken back, as occurs when driving into a curve (case 2), an upshift must be prevented in the first place. A decreasing output speed that follows a possible downshift is eliminated until the driver actuates the accelerator pedal or the brake, that is, is ready to change the driving characteristics. It is convenient that a change of the driving characteristics be detected or issued via a fuzzy memory mode.

In strong deceleration (case 3) it is convenient to shift quickly in small gear steps. If after braking the driver intends to immediately accelerate (great desired performance), the traction needed to accelerate is immediately prepared by a small gear step. Therefore, the driver can accelerate without delay without first downshifting. The downshift is carried out depending on the actual engine speed (turbine speed) so that an excessive braking of the vehicle is also prevented here.

The same additional rule 5 is used for the functions according to Nos. 1 and 2. An advantage of the fuzzy logic method also becomes evident here.

The spontaneous driving modes conditioned by the situation (for example, cornering, short downhill or uphill runs, etc.) require a spontaneous reaction. The driving mode must directly penetrate to the gear or ratio selection without it being needed to previously pass through filter algorithms.

It is therefore convenient to take the described situation-conditioned driving modes into consideration by the proposed additional rules directly in the basic module (function block 11). To take into account the requirement of a direct penetration, the function blocks 13 and 14 have a direct connection to the basic module which is highlighted by the corresponding connecting line in FIG. 1.

Possible modifications:

The hitherto presented operation variants use the nominal gear (ratio) standard as a correcting quantity to conform with the desired performance coming from the driver. The desired performance here is a functionally composed (fictitious) quantity which indicates in general to what extent the driver is satisfied with the actual driving mode.

Said quantity cannot be measured or calculated from the actual driving modes and thus cannot be used as feedback of an actual value to build up a regulation circuit. From the point of view of control technology the action chain represented is thus a control of the quantity desired performance (first mode of operation), which transforms the performance requirements of the driver primarily into a gear to be shifted. There always remains a factor of uncertainty, since the driver not only would like to release a gear but would like to change the driving characteristics in a certain manner and direction toward acceleration or deceleration. This circumstance is not taken into consideration in this first mode of operation.

Therefore, it can be advantageous, to derive a physical quantity in relation to the driver's desired acceleration from the fictitious quantity "desired performance" and the quantity "driving manner" (driving situation). In another (second driving mode) said physical quantity is the excess traction (or excessive torque), that is, the physical cause of a vehicle acceleration according to $F=m \times a$.

The desired performance and the driving manner are linked advantageously via fuzzy generating rules because of the non-linear connection. For this purpose, the quantity "excess traction" is divided in 5 classes (negatively great, negatively medium, zero, positively medium, positively great). The limiting values of said classes are prescribed by the vehicle parameters, the negative value range (deceleration) generally decreasing more than the positive value range (acceleration).

In the appertaining fuzzy rule equipment are contained the following tendencies (guidelines):

1. The greater the desired performance and sportier the driving manner, the greater the desired excess traction.
2. The smaller the desired performance and sportier the driving manner, the smaller the desire excess traction.

Figure 11:
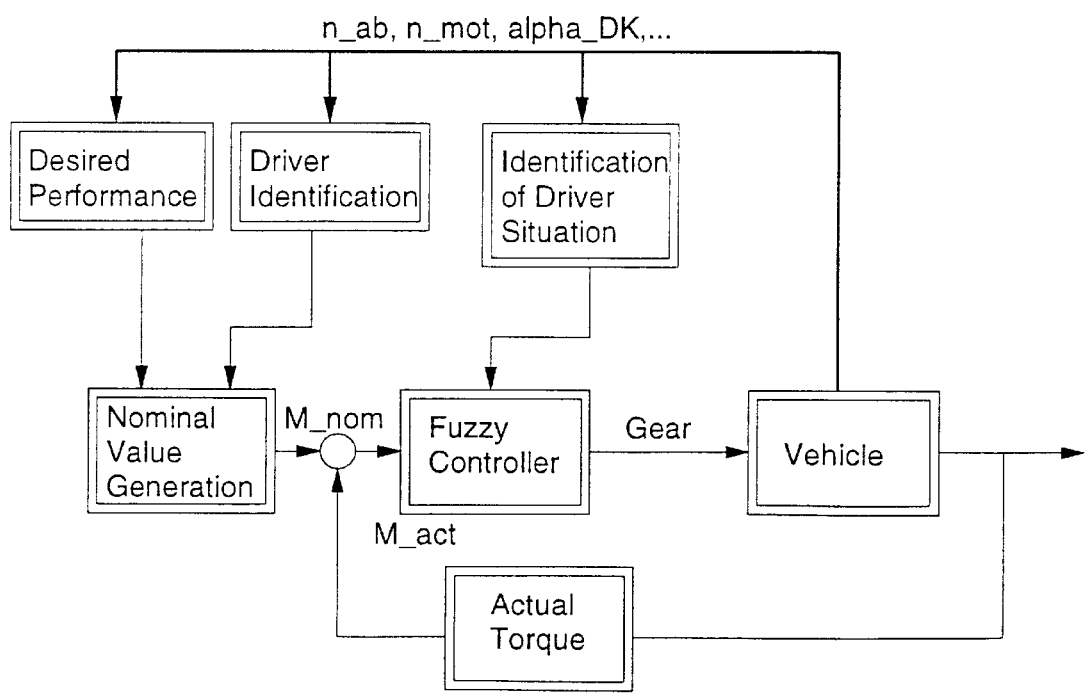
FIG. 11 is the diagrammatic reproduction of a closed regulation circuit.

The standard value thus found for the desired excess traction is fed as nominal value in a regulation circuit structure which contains the actually existing excess traction (calculated from $A=m \times a$) as a feedback value, that is, a regulation with nominal-actual comparison exists (FIG. 11). The control works according to fuzzy generating rules and depending on driving situations gives a gear or a ratio step to be adjusted to the transmission/vehicle system, as a set quantity.

The dependence on the driving situation is here also to be regarded as a test of plausibility of what gear best does justice to the actual deviation from nominal and actual excess traction.

In mountain driving and a great desired acceleration of the driver (excess traction positively great) it is convenient to remain in the lower speed levels. On the other hand, with corresponding requirement on the level road, higher speed levels also deliver the desired excess traction which altogether leads to an economic driving manner. The problem of oscillating shifts in mountain driving is reliably avoided also with said procedure.

Another advantage of this second operating mode is the possibility of simple classification in superposed regulation and control concepts of the input power train. The regulation circuit structure remains for said purpose in the range of the transmission control while the nominal value in the superposed control is produced (transmission control=intelligent actuator).

Reference numerals 1 vehicle
2 engine
3 automatic transmission
4 input shaft power train
5 differential gear
6 driven wheels
7 steerable wheels
8 input variables
9 means to detect the input variables
10 control system
11 function block
12 function block
13 function block
14 function block
15 function block
16 function block
17 function block -continued

| Reference numerals |
| --- |
| 18 input |
| 19 output |
| 20 position |
| 21 position |
| 22 signaling line |
| 23 signaling line |

We claim:

1. A fuzzy logic control system, for changing a ratio of an automatic transmission, comprising:

detection means for detecting input variables derived from a driver-vehicle system, said input variables comprising at least one of a throttle valve position and an absolute accelerator pedal position, and at least one adjustment dynamic thereof;

actuator means for changing a ratio of the automatic transmission; and fuzzy processing means for determining output variables with which the transmission ratio is determined in order to control the actuator means, the fuzzy processing means having fuzzy generation means for generating related functions in the form of fuzzy sets for said input variables, and the fuzzy processing means determining the output variables according to the input variable fuzzy sets and a set of basic and additional fuzzy generating rules;

wherein at least one of the throttle valve position and the absolute accelerator pedal position and at least one adjustment dynamic thereof are processed in a fuzzy module according to fuzzy rules based on a representative cross section of drivers, independent of an actual driving manner, to provide an output which represents a desired performance of the driver and forms a further input variable for the fuzzy processing means and thereby the set of basic and additional fuzzy generating rules.

2. The control system according to claim 1, wherein said input variables further comprise at least one of an engine speed, a transmission input speed, a vehicle acceleration, a vehicle deceleration, and a vehicle speed.

3. The control system according to claim 1, wherein said desired performance is a functionally composed quantity which provides information relating to an extent to which the driver is satisfied with an actual driving mode.

4. The control system according to claim 2, wherein the input variables are processed according to fuzzy generating rules.

5. The control system according to claim 2, wherein the relation between the accelerator pedal position and gradients of the accelerator pedal position and a relation between throttle valve position and adjustment of throttle valve, as a time function, is determined from a survey of a representative cross section of drivers.

6. The control system according to claim 1, wherein the desired performance corresponds to at least one of a desired acceleration and a desired deceleration.

7. The control system according to claim 6, wherein the desired deceleration is detected via at least one of the accelerator pedal, the throttle valve, and a brake.

8. The control system according to claim 7, wherein the desired deceleration indicated via at least one of the accelerator pedal, the throttle valve, and the brake is quantitatively differently weighted.

9. The control system according to claim 1, wherein a direction of change of the desired performance is differently weighted so that upon positive changes, resulting from an opened throttle, an undelayed communication to the further processing control system results while, upon negative changes of the desired performance resulting from a closed throttle, a delayed communication results.

10. The control system according to claim 9, wherein a filter is connected downstream, for detecting a desired acceleration or deceleration, the time constant of the filter is variable according to a particular driving situation.

11. The control system according to claim 10, wherein said filter has a small time constant for larger filter input signal values and a large time constant is effective for smaller filter input signal values.

12. The control system according to claim 10, wherein the filter is impressed with a basic characteristic.

13. The control system according to claim 1, wherein an adaptive filter structure, having a learning feature which is variable depending on a driving mode of the vehicle, is provided for identification of the driver of the vehicle.

14. A control system (10) for changing the ratio of an automatic transmission, the control system (10) having means (9) for detecting input variables derived from a driver-vehicle system, means for generating related functions for said input variables, and means for changing transmission ratios, said means for detecting the input variables, said means for generating related functions and said means for changing the transmission ratios interacting so as to find, according to fuzzy generating rules, output variables with which a transmission ratio is determined, wherein a throttle valve position, an adjusting dynamic, and a driving manner produce, according to fuzzy generating rules, a physical quantity in the form of one of excess traction and excess torque, which is fed as a nominal value to a regulation circuit which contains as a feedback value the actually existing excess traction (calculated from $F=m \times a$).

15. The control system according to claim 14, wherein the control operates according to fuzzy generating rules and, depending upon a driving situation, issues as an output value one of a gear and a ratio step to be adjusted in the automatic transmission.

16. The control system according to claim 14, wherein the excess traction, during instances of a performance mode, is relatively large and, during instances of an economic mode, is relatively small.

17. A fuzzy logic control system, for changing the ratio of an automatic transmission, comprising:

detection means for detecting input variables derived from a driver-vehicle system;

generating means for generating related functions in a form of fuzzy sets for said input variables;

desired-performance determination means for generating a desired-performance output according to the input variables detected by the detection means, said input variables being at least one of a throttle valve position and an absolute accelerator pedal position and at least one adjustment dynamic thereof;

output determination means for determining output variables according to fuzzy generating rules and said fuzzy sets, said fuzzy generating rules containing at least a set of basic rules and additional rules, and the output determination means receiving the input variables and the desired performance output as inputs; and means for changing a transmission ratio of the automatic transmission according to said output variables.

* * * * *